US012232505B2

(12) United States Patent
Masanés Autard et al.

(10) Patent No.: US 12,232,505 B2
(45) Date of Patent: Feb. 25, 2025

(54) PROCESSES AND METHODS FOR PRODUCING AN EDIBLE CREAM FROM OLIVES

(71) Applicant: Tomás Masanés Autard, Tracy, CA (US)

(72) Inventors: Tomás Masanés Autard, Tracy, CA (US); Lisandro Castro, San Juan (AR)

(*) Notice: Subject to any disclaimer, the term of this patent is extended or adjusted under 35 U.S.C. 154(b) by 299 days.

(21) Appl. No.: 17/230,440

(22) Filed: Apr. 14, 2021

(65) Prior Publication Data
US 2021/0315224 A1 Oct. 14, 2021

Related U.S. Application Data

(60) Provisional application No. 63/009,880, filed on Apr. 14, 2020.

(51) Int. Cl.
A23C 9/154 (2006.01)
A23D 7/005 (2006.01)
(Continued)

(52) U.S. Cl.
CPC .......... A23C 9/1544 (2013.01); A23D 7/0056 (2013.01); A23D 7/02 (2013.01);
(Continued)

(58) Field of Classification Search
CPC .......... A23L 9/22; A23L 9/1544; A23L 29/10; A23D 7/0056; A23D 7/02; A23C 2210/30
See application file for complete search history.

(56) References Cited

U.S. PATENT DOCUMENTS

2012/0045406 A1  2/2012  Urban et al.
2012/0141618 A1*  6/2012  Colicci ............... A23D 7/0053
                                                              426/602
2013/0034643 A1  2/2013  Turgeman et al.
2015/0045449 A1  2/2015  Nakajima et al.
(Continued)

FOREIGN PATENT DOCUMENTS

CN  101903410  12/2010
CN  102395284  3/2012
(Continued)

OTHER PUBLICATIONS

"Technological changes in the Virgin Olive Extraction Process" Available online at https://blog.esao.es/en/technological-changes-in-the-virgin-olive-oil-extraction-process on Nov. 2, 2020. (Year: 2020).*

(Continued)

Primary Examiner — Donald R Spamer
Assistant Examiner — Assaf Zilbering
(74) Attorney, Agent, or Firm — Marcus N. DiBuduo; John R. Aaron

(57) ABSTRACT

An edible, olive oil based cream and processes for producing the same. Processes for producing an edible cream may include: milling olives to form a paste; malaxating the paste; centrifuging the paste into an oil phase, an aqueous phase, and pomace; centrifuging the aqueous phase; separating the aqueous phase into a precipitate and supernatant; filtering the supernatant; and homogenizing the supernatant, oil phase, and an emulsifier to produce an edible cream. An edible cream may comprise olive oil, olive vegetation water, an emulsifier and, optionally, one or more additional ingredients.

47 Claims, 4 Drawing Sheets

(51) Int. Cl.
  *A23D 7/02*    (2006.01)
  *A23L 9/20*    (2016.01)
  *A23L 29/10*   (2016.01)

(52) U.S. Cl.
  CPC .................. *A23L 9/22* (2016.08); *A23L 29/10* (2016.08); *A23C 2210/30* (2013.01)

(56) References Cited

U.S. PATENT DOCUMENTS

2016/0302459 A1  10/2016  Alexandre et al.
2018/0295851 A1  10/2018  Pompili Ferrari et al.

FOREIGN PATENT DOCUMENTS

| CN | 102666821 | 9/2012 | |
| CN | 103494862 | 1/2014 | |
| CN | 103842089 | 6/2014 | |
| CN | 110799040 | 2/2020 | |
| WO | WO2017064737 A1 | 4/2017 | |
| WO | WO-2018189730 A1 * | 10/2018 | ........... A23D 7/0053 |

OTHER PUBLICATIONS

International Search Report and Written Opinion relating to international application No. PCT/US21/27254, dated Aug. 25, 2021.

Rubio-Senent et al., "Novel pectin present in new olive mill wastewater with similar emulsifying and better biological properties than citrus pectin", Food Hydrocolliods, Aug. 2015, pp. 237-246, vol. 50, ScienceDirect, https://www.sciencedirect.com/science/article/pii/S0268005X15001691.

Cano-Sarmiento et al., "Zeta Potential of Food Matrices", Food Engineering Reviews, Apr. 5, 2018, pp. 113-138, vol. 10, SpringerLink, https://doi.org/10.1007/s12393-018-9176-z.

Allende et al., "Destabilization-Enhanced Centrifugation of Metalworking Oil-in-Water Emulsions: Effect of Demulsifying Agents", Chem. Eng. Technol., Feb. 6, 2008, pp. 1007-2014, vol. 7, Wiley-Vch Verlag GmbH & Co. KGaA, Weinheim.

Supplementary Search Report issued Mar. 15, 2024 for counterpart European Application No. 21789299.1.

Machine translation of description of CN110799040, retrieved from https://worldwide.espacenet.com/patent on Jun. 26, 2024.

Machine translation of description of CN101903410, retrieved from https://worldwide.espacenet.com/patent on Jun. 26, 2024.

Machine translation of description of CN102395284, retrieved from https://worldwide.espacenet.com/patent on Jun. 26, 2024.

Machine translation of description of CN102666821, retrieved from https://worldwide.espacenet.com/patent on Jun. 26, 2024.

Machine translation of description of CN103494862, retrieved from https://worldwide.espacenet.com/patent on Jun. 26, 2024.

Machine translation of description of CN103842089, retrieved from https://worldwide.espacenet.com/patent on Jun. 26, 2024.

* cited by examiner

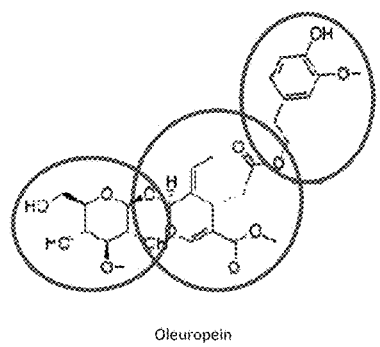
FIG. 2
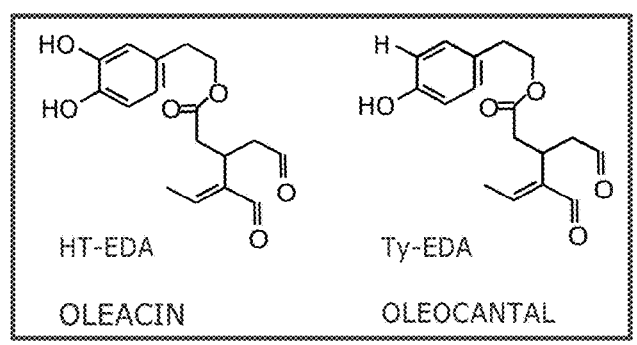
FIG. 3
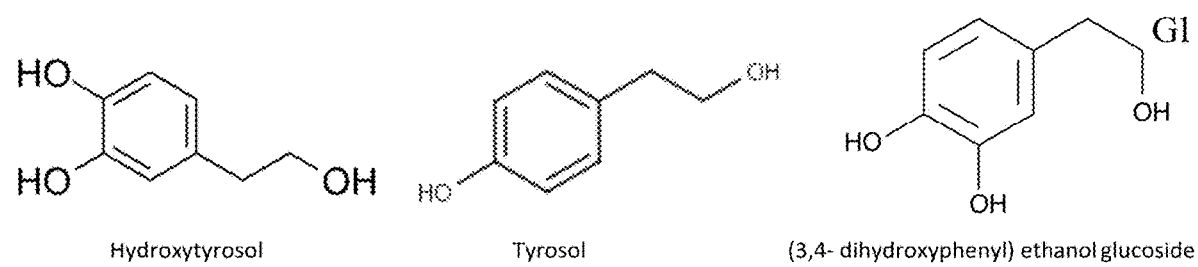
FIG. 4A     FIG. 4B     FIG. 4C

1 Product infeed
2 Product discharge
3 Homogenizer
4 Drain
5 Scraper
6 Vortex breaker
7 Vacuum system
8 Heating / cooling
9 CIP sprayball

PROCESSES AND METHODS FOR PRODUCING AN EDIBLE CREAM FROM OLIVES

CROSS-REFERENCE TO RELATED APPLICATIONS

The present application claims priority to, and the benefit of, U.S. Provisional Patent Application No. 63/009,880, filed Apr. 14, 2020, which is hereby incorporated by reference in its entirety.

FIELD OF THE INVENTION

The present invention relates to an olive-based product and a process producing the same. More particularly, the present invention concerns processes and methods for making an edible, polyphenol rich cream composed primarily of olive oil and olive vegetation water.

BACKGROUND OF THE INVENTION

Polyphenols are a type of organic compounds known for, or believed to have, several health benefits including protecting against oxidative stress, diseases related to aging, heart disease, high blood pressure and cholesterol, and certain types of cancer. As a result, these compounds have been the focus of medical research for several years. Various foods are known to be rich in polyphenols, such as oranges, blueberries, spinach, and, in particular, olives. Consequently, there has been research and development focused on the use of polyphenols as a byproduct of olive milling obtained from the aqueous phase of processing. The aqueous phase of olives, or olive vegetation water, is a dark liquid with a bitter taste that results from pressing the olive fruits during olive oil processing. This sub-product is typically an effluent from olive oil factories.

Olive vegetation water may be variable in terms of composition, depending on the variety of olive used, maturity index, and elaboration process (as kneading time and temperature in malaxators may vary). For example, relatively long malaxation times may produce olive vegetation water which may be relatively uniform in terms of its composition, whereas relatively short malaxation times may produce olive vegetation water with a non-uniform composition, causing multiple layers to form. Similarly, the addition of water to olive vegetation water may also affect composition, causing multiple layers to form.

The concentration of polyphenols present in olives may be influenced by the variety used, maturity index, and agroecological conditions. For example, in olives with relatively low maturity indices may generally have a relatively higher polyphenol content (e.g., Changlot, Manzanilla, and Empeltre varieties). Furthermore, the polyphenol content in olives may generally be higher in the aqueous phase relative to the oil phase of olives. However, the relative distribution of polyphenols between the aqueous phase and the oil phase may depend on the variety and maturity stage of olives, as well as the extraction process used. After milling, polyphenols may be primarily concentrated in the olive vegetation water, even in a higher concentration than in the oil obtained from the same olives. The concentration of polyphenols may also be affected by other substances such as fat, fiber (e.g., cellulose, hemicellulose, lignin), proteins, and sugars, which may interfere with the quality of the final product.

The bitterness in raw olives may be generally attributed to the presence of oleuropein, which is the most common phenolic compound present in olives at the time of harvest. Hydroxytyrosol, one of the main macromolecules of oleuropein, has a number of benefits, including: antioxidant activity in aqueous and lipid matrices; anti-inflammatory, anti-microbial, anti-platelet and anti-tumor activity; protective effect against neurodegenerative diseases; human immunodeficiency virus (HIV) inhibitory effect; and decreased oxidation of low-density lipoproteins (LDLs). Relative to hydroxytyrosol, dihydroxyphenyl glycol (DHPG) also has a number of benefits, including: greater antiradical activity and reducing power; greater protection against lipid oxidation relative to Vitamin E (and hydroxytyrosol); and greater inhibition to platelet aggregation. DHPG also has an important synergistic effect with hydroxytyrosol in tests of lipid oxidation, platelet aggregation, enzymatic and antibacterial browning. Oleocanthal has anti-inflammatory properties by inhibiting the activity of cyclooxygenase (COX) enzymes, such as ibuprofen, a protective effect against Alzheimer's disease, and contributes to the prevention or treatment of colon cancer. Oleacein presents antiproliferative properties. Oleuropein aglycone (HT-EA) has antiallergic properties and protects against Alzheimer's. Lignans, which are found in olive oil, have antioxidant and antiviral activity that inhibits the development of different tumor types and, in turn, has an antiestrogenic effect and activity against atherosclerosis and osteoporosis.

Oleuropein is not the only phenolic compound found in olives. Phenolic compounds can be grouped into four broad categories: phenolic acids; phenolic alcohols; flavonoids; and secoiridoids. While not all phenolic compounds may contribute to the bitterness of an olive, these compounds play an important role in the flavor profile and in the promotion of health benefits. Phenolic acids (C6-C1 backbone) detected in olives include caffeic acid, p-coumaric acid, o-coumaric acid, ferulic acid, sinapinic acid, syringic acid, hydroxybenzoic acid, dihydrocaffeic acid, vanillic acid, 3,4-dihydroxybenzoic acid, and gallic acid. Phenolic alcohols consist of a phenyl group (—C6H5) attached to a hydroxyl group (—OH). Phenolic alcohols frequently detected in olive products include homovanillyl alcohol, hydroxytyrosol, and tyrosol.

Flavonoids (C6-C3-C6 backbone) frequently found in olives include luteolin-7-glucoside, cyanidine-3-glucoside, cyanidine-3-rutinoside, rutin, apigenin-7-glucoside, quercetin-3-rhamnoside, and luteolin.

Secoiridoids are phenolic compounds found in very few edible plants apart from olives and are among the most important compounds regarding the sensory perception of bitterness. Secoiridoids are characterized by an exocyclic functionality of 8,9-oleic acid, composed of an elenolic acid and a glycosidic bond joining monosaccharides, also known as an oleosidic skeleton that include oleuropein aglycone, ligstroside aglycone, oleacein, and oleocanthal, compounds that are known to be bitter or considered likely to be bitter.

BRIEF SUMMARY OF THE INVENTION

The present invention concerns an edible, olive oil based cream with a high polyphenol content and a process for making the same. The edible cream may be made from water from previously treated vegetation water and extra virgin olive oil extracted by mechanical means. The present invention utilizes olive vegetation water, or the aqueous phase of olives, in the production of an edible, olive oil based cream which is rich in polyphenols, taking advantage of the natural high content of bioactive components in this sub-product.

The vegetation water may be physically and chemically treated and emulsified with the extra virgin olive oil using purpose-designed equipment to obtain a soft cream with a polyphenol content which may be at least 50% higher than existing olive oils. Emulsification may be achieved using citrus fiber, a natural hydrocolloid that acts as an emulsifier and has a large percentage of soluble fiber (~34% high purity pectin). From a nutraceutical point of view, it improves the functioning of the intestinal tract. Citrus fiber may replace emulsifiers conventionally used in the food industry as modified starches.

The concentration of polyphenols in the aqueous phase may be generally high, however, the concentration can be variable. Therefore, in accordance with some embodiments of the present invention, processes for standardizing the raw material to produce a "treated" aqueous phase are disclosed herein. Standardizing the chemical and sensory composition of the aqueous phase is one objective of the present invention which allows for finished products that are also standardized and that meet the chemical, physical, and sensory specifications.

Bioactive components become more available when chemically released from their macromolecules, as is the case with hydroxytyrosol, which, in preferred embodiments, is a main phenolic component of the edible cream. Hydroxytyrosol is produced as the result of oleuropein hydrolysis catalyzed by endogenous enzymes and facilitated by heat processes applied to the aqueous phase. Therefore, a heat treatment is carried out to complete the hydrolysis of oleuropein, ligstroside, and their aglycones, resulting in hydroxytyrosol and tyrosol. Then, with a homogenization process, a soft, creamy olive oil based paste may be obtained which is enriched with polyphenols. To preserve the product, a hot filling method may be utilized, in which the product may be packaged at elevated temperatures with a previous acidifying process.

In accordance with some embodiments of the present invention, the edible cream may provide a consumer an alternative condiment for a wide range of foods, such as, but not limited to, meat, fish, and cooked vegetables. The edible cream may also provide an alternative option to salad dressing, for example, as the edible cream may be relatively lower in calories and higher in polyphenol content compared to conventional extra virgin olive oils used in existing salad dressings.

According to some embodiments of the present invention, a process for producing an edible cream from olives may comprise the steps of: a) milling the olives to form a paste; b) malaxating the paste; c) centrifuging the paste into a resultant oil phase, a resultant aqueous phase, and a resultant pomace; d) centrifuging the aqueous phase; e) separating the aqueous phase into a resultant precipitate and a resultant supernatant; f) filtering the supernatant; and g) homogenizing the supernatant, the oil phase, and an emulsifier to form the edible cream.

In some embodiments, olives may have a maturity index of between 1 and 5.

In some embodiments, a variety of olives may be Koroneiki, Manzanilla, Changlot Real, Hojiblanca, Empeltre, Coratina, or Arbequina.

In some embodiments, a step of milling olives may comprise crushing the olives through a sieve having a size of about 4 to about 7 mm.

In some embodiments, a step of malaxating a paste may occur for a duration of between about 35 minutes and about 95 minutes.

In some embodiments, a step of malaxating a paste may occur at a temperature of between about 22° C. and about 37° C.

In some embodiments, a step of centrifuging a paste may comprise horizontally centrifuging the paste at between about 3,200 and about 3,700 revolutions-per-minute. In some embodiments, the step of centrifuging the paste may comprise adding water to the paste.

In some embodiments, a step of centrifuging aqueous phase may comprise vertically centrifuging the aqueous phase at between about 6,800 and about 7,200 revolutions-per-minute.

In some embodiments, a step of separating aqueous phase may comprise precipitating the aqueous phase. In some embodiments, precipitating the aqueous phase may comprise adjusting a pH of the aqueous phase. In some embodiments, the pH of the aqueous phase may be adjusted to between about 4.6 and about 7. In some embodiments, the pH of the aqueous phase may be adjusted by the addition thereto of sodium hydroxide or lime milk, and combinations thereof. In some embodiments, precipitating the aqueous phase may comprise adjusting a Zeta potential of the aqueous phase. In some embodiments, the Zeta potential of the aqueous phase may be adjusted by the addition thereto of aluminum polychloride.

In some embodiments, a step of separating aqueous phase may comprise macerating and distilling the aqueous phase.

In some embodiments, a step of separating aqueous phase may comprise adsorption with resins and distilling the aqueous phase.

In some embodiments, a step of separating aqueous phase may comprise heating the aqueous phase.

In some embodiments, a step of filtering a supernatant may comprise filtering the supernatant through a plate filter having a filter size of between about 10 to about 40 micrometers.

In some embodiments, a process for producing an edible cream from olives may further comprise, after a step of filtering the supernatant and before a step of combining the supernatant to produce the mixture, a step of heating the supernatant. In some embodiments, the step of heating the supernatant may comprise heating the supernatant to a temperature of between about 60° C. and about 95° C. In some embodiments, the step of heating the supernatant may occur for a duration of between about 1 and about 3 hours. In some embodiments, the step of heating the supernatant may comprise heating the supernatant to a temperature of greater than about 100° C. In some embodiments, the step of heating the supernatant may comprise adding an acidic solution to the supernatant. In some embodiments, the acidic solution may comprise an acid, wherein the acid may be sulfuric acid or phosphoric acid.

In some embodiments, an emulsifier may comprise citrus fiber.

In some embodiments, a step of homogenizing may comprise combining an acid with a supernatant, an oil phase, and an emulsifier. In some embodiments, the acid may comprise lactic acid, citric acid, malic acid, or lemon juice, and combinations thereof.

In some embodiments, a step of homogenizing may comprise combining a salt with a supernatant, an oil phase, and an emulsifier.

In some embodiments, a step of homogenizing may comprise combining a flavorant with a supernatant, an oil phase, and an emulsifier. In some embodiments, the flavorant may comprise a salt, citrus juice, peppers, or garlic, and combinations thereof.

In some embodiments, a step of homogenizing may comprise combining a first preparation with a second preparation to form an edible cream, wherein the first preparation may comprise an oil phase and an emulsifier, and wherein the second preparation may comprise a supernatant. In some embodiments, the first preparation may comprise an acid, a salt, or a flavorant, and combinations thereof. In some embodiments, the second preparation may comprise an acid, a salt, or a flavorant, and combinations thereof.

In some embodiments, an edible cream may comprise, by weight, greater than about 35% of an oil phase and less than about 56% of a supernatant. In some embodiments, an emulsifier may comprise citrus fiber and the edible cream may comprise lemon juice, lactic acid, and salt, wherein the edible cream may comprise, by weight, between about 1.3% and about 3% citrus fiber, between about 4% and about 5% lemon juice, between about 0.4% and about 1% lactic acid, and between about 1.3% and about 3% salt. In some embodiments, the edible cream may comprise less than about 3% by weight of a flavorant.

In some embodiments, a process for producing an edible cream from olives may comprise a step of preserving the edible cream. In some embodiments, the step of preserving the edible cream may comprise correcting the pH of the edible cream to less than about 4.6. In some embodiments, the step of preserving the edible cream may comprise packaging the edible cream at a temperature greater than about 80° C.

According to some embodiments of the present invention, a process for manufacturing an edible cream may comprise the sequential steps of: a) horizontally centrifuging olive paste into a resultant oil phase and a resultant aqueous phase; b) vertically centrifuging the aqueous phase; c) adjusting a pH of the aqueous phase to between about 4.6 and about 7 by the addition thereto of sodium hydroxide or lime milk, and combinations thereof; d) adjusting a Zeta potential of the aqueous phase by the addition thereto of aluminum polychloride; e) precipitating the aqueous phase into a resultant supernatant; f) filtering the supernatant through a plate filter having a filter size of between about 10 to about 40 micrometers; g) heating the supernatant; and h) homogenizing the oil phase, the supernatant, and an emulsifier by first combining the oil phase and the emulsifier, and then combining the supernatant with the combined oil phase and the emulsifier.

In some embodiments, a heating step may comprise heating a supernatant to a temperature of between about 60° C. and about 95° C. for a duration of between about 1 and 3 hours.

In some embodiments, a heating step may comprise adding an acidic solution comprising an acid to a supernatant and heating the supernatant to a temperature of greater than about 100° C., wherein the acid may be sulfuric acid or phosphoric acid.

According to some embodiments of the present invention, an edible cream may comprise a homogenized mixture of olive oil, a supernatant of olive vegetation water, and an emulsifier, wherein the olive oil and the olive vegetation water may be resultants of centrifuged olive paste, and wherein the supernatant may be a resultant of centrifugation, precipitation, filtration, and heating of the olive vegetation water. In some embodiments, the edible cream may comprise by weight greater than about 35% of the olive oil, less than about 56% of the supernatant, and between about 1.3% and about 3% of the emulsifier. In some embodiments, the edible cream may comprise lemon juice, lactic acid, and salt. In some embodiments, the amounts in the edible cream, by weight, may be: between about 35% and about 70% of the olive oil; between about 23% and about 56% of the supernatant of the olive vegetation water; between about 1.3% and about 3% of the citrus fiber; between about 4% and about 5% of the lemon juice; between about 0.4% and about 1% of the lactic acid; and between about 1.3% and about 3% of the salt.

BRIEF DESCRIPTION OF THE DRAWINGS

FIG. 2 is a diagram illustrating the chemical structure of oleuropein.

FIG. 3 is a diagram illustrating the chemical structures of the dialdehyde forms of dicarboxymethyl oleuropein aglycone and ligstroside.

FIGS. 4A-C are diagrams illustrating the chemical structures of hydroxytyrosol, tyrosol, and dihydroxyphenyl ethanol glucoside, respectively.

DETAILED DESCRIPTION OF THE INVENTION

The invention, in its various aspects, will be explained in greater detail below. While the invention will be described in conjunction with several exemplary embodiments, the exemplary embodiments themselves do not limit the scope of the invention. Similarly, the exemplary illustrations in the accompanying drawings, where like elements have like numerals, do not limit the scope of the exemplary embodiments and/or invention, including any length, angles, or other measurements provided. Rather the invention, as defined by the claims, may cover alternatives, modifications, and/or equivalents of the exemplary embodiments.

In accordance with some embodiments, the present invention may generally relate to the production of an edible, olive oil based cream using extra virgin olive oil, processed olive vegetation water (sometimes referred to hereinafter as "aqueous phase"), an emulsifier, an acid, and/or one or more additional ingredients which may enhance flavor, texture, or any other physical or chemical properties of the cream. In preferred embodiments, the edible cream may be enriched with polyphenols, preferably with a minimum polyphenol content which may be about 50% higher than that of conventional extra virgin olive oil.

Figure 1:
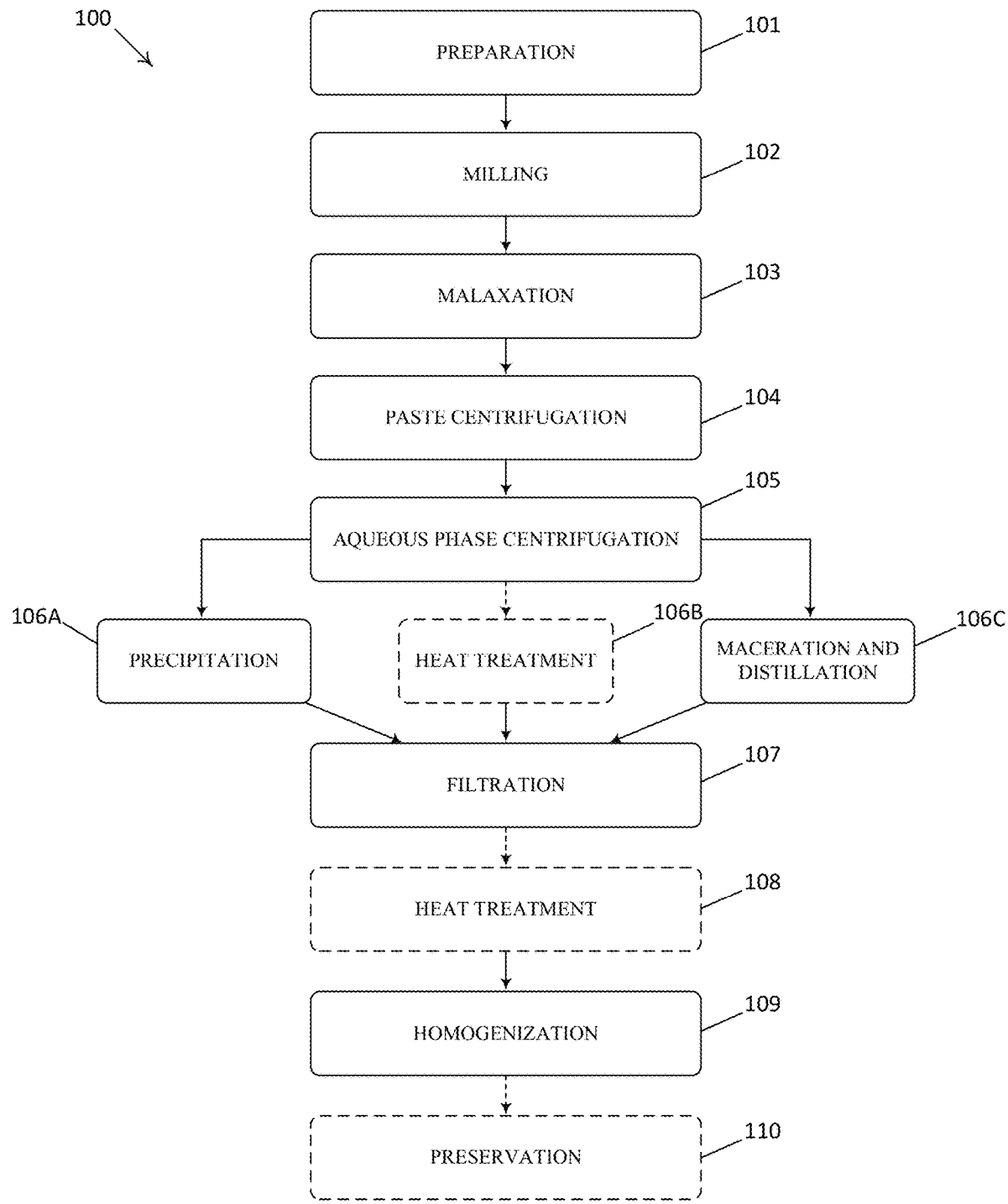
FIG. 1 is a flowchart illustrating an exemplary process for producing an edible cream.

In preferred embodiments of the present invention, a process for producing an edible, olive oil based cream may be generalized by a series of steps, such as those illustrated in FIG. 1. For example, a process 100 may comprise a preparation step 101, followed by a milling step 102, followed by a malaxation step 103, followed by a paste centrifugation step 104, followed by an aqueous phase centrifugation step 105. In some implementations, aqueous phase centrifugation step 105 may be followed by either a precipitation step 106A, a heat treatment step 106B, and/or a maceration and distillation step 106C. Following either precipitation step 106A or maceration and distillation step 106C may be a supernatant filtration step 107, followed by a heat treatment step 108, and then a homogenization step 109. However, according to some implementations, if aqueous phase centrifugation step 105 was followed by heat treatment step 106B, supernatant filtration step 107 may be followed by homogenization step 109. Optionally following homogenization step 109 may be a preservation step 110.

In some embodiments, a process for producing an edible, olive oil based cream may further generalized by four stages: i) selection of raw materials/ingredients; ii) obtaining vegetation water from olives; iii) homogenization; and iv) preservation.

I. Selection of Raw Materials/Ingredients

In preparation step 101, olives may first be selected for processing based on a number of criteria. According to some embodiments of the present invention, olives selected as a raw material may be in good sanitary conditions, washed, and may have a maturity index of between 1 and 5. Various olive varieties may be selected for use, such as, but not limited to, Koroneiki, Manzanilla, Changlot Real, Hojiblanca, Empeltre, Coratina, and Arbequina varieties. During the olive oil extraction process, extra virgin olive oil and sub-products of milling may be obtained. Such sub-products may include vegetation water (aqueous phase) and olive skin and flesh, fragmented pits, and moisture from vegetation water (collectively, pomace).

Due to variability in the composition of the aqueous phase, as well as in the concentration of polyphenols, in accordance with some embodiments, the present invention may provide manufacturing processes which may be utilized for the objective of standardizing chemical, physical, and sensory characteristics of the aqueous phase.

II. Obtaining Vegetation Water from Olives

The processes described hereinafter may be provided in order to isolate polyphenols from other substances which may interfere with the production process. To achieve this, olives selected for processing may undergo a series of steps which may generally include cleaning, milling, malaxating, and liquid-solid separation.

Preparation step 101 may also include cleaning of the selected olives. For example, when olives are received at a facility in bins, impurities may be removed from the olives by applying streams of air and water to separate the olive fruits from plant debris, soil, food residues, dirt, grease, or other undesirable matter. Once the olives have been properly cleaned, the process may continue onto milling step 102.

During milling step 102, and in accordance with some embodiments of the present invention, the olives may be transported to a mill with metal crushers for grinding the olives into a paste. In some embodiments, the crushers may be equipped with screens for regulating the particle size of the olive paste. In preferred embodiments, the crushers may be equipped with a sieve having a size of about 4 to about 7 mm. Following milling step 102, the olive paste may be subjected to malaxation step 103. In some embodiments, mixing of the olive paste and temperature regulation may be accomplished by malaxators that amalgamate the droplets of oil dispersed in the crushed olive paste into larger-sized drops, facilitating the separation of the aqueous phase from the solid phase. In some implementations, this process may occur for about 20 minutes to about 110 minutes. In a preferred implementation, this process may occur for about 35 minutes to about 95 minutes. In some implementations, the temperature of the olive paste may be regulated between 20° C. and about 40° C. In a preferred implementation, the temperature of the olive paste may be regulated between about 22° C. and about 37° C.

Following malaxation step 103, the mixed olive paste may be subjected to paste centrifugation step 104. According to some embodiments, this stage of the process may involve liquid-solid separation of the mixed olive paste phases (i.e., oil, pomace, and aqueous phases), whereby the constituent parts of the mixed olive paste may be separated according to their density. In some embodiments, the mixed olive paste may be separated using a horizontal centrifuge of a three-phase decanter. In some implementations, a horizontal centrifuge may operate between 3,000 and about 4,000 revolutions-per-minute ("RPM"). In preferred implementations, a horizontal centrifuge may operate between about 3,200 to about 3,700 RPM. In accordance with some implementations, throughout paste centrifugation step 104, water may be added to the mixed olive paste to be centrifuged. In preferred implementations, water may be added to the mixed olive paste at an amount sufficient to bring the moisture content of the mixture to between about 28% and about 33%.

Three sub-products or phases may be obtained from the decanter—extra virgin olive oil phase, aqueous phase, and pomace. In some implementations, the centrifuged olive paste may comprise about 64% aqueous phase, about 30% pomace phase, and about 6% oil phase. In some embodiments, the aqueous phase is the primary sub-product of olive milling that is to be standardized in its chemical and physical composition with manufacturing processes, as disclosed herein. In some implementations, the quantity of aqueous phase obtained by centrifugation may generally be between about 0.1 and about 1.0 liters per kg of centrifuged olive paste. In preferred implementations, the quantity of aqueous phase obtained by centrifugation may be between about 0.3 and about 0.7 liters per kg of olive paste centrifuged.

IIA. Aqueous Phase Centrifugation

According to some embodiments, paste centrifugation step 104 may be followed by aqueous phase centrifugation step 105, during which the aqueous phase obtained from centrifuged olive paste may be subjected to centrifugal force to remove traces of oil and insoluble organic compounds. During this step, and in accordance with some implementations, a vertical centrifuge operating between about 6,500 RPM and 7,500 RPM may be used. In preferred implementations, a vertical centrifuge operating between about 6,800 to about 7,200 RPM may be used. In some implementations, a vertical centrifuge may be used with separation rings between about 90 and about 115 millimeters. In preferred implementations, a vertical centrifuge may be used with separation rings between about 95 and about 110 millimeters. In some implementations, a vertical centrifuge may be used with a number of separation plates being between about 85 and 100. In preferred implementations, a vertical centrifuge may be used with a number of separation plates being between about 90 and about 94.

Following centrifugation of the aqueous phase, the total fat content in the aqueous phase may be reduced by more than about 50% and the amount of recovered oil may be between about 0.1% and about 1.8%. In some implementations, the fat content of the aqueous phase after undergoing a centrifugation process may be reduced by about 63%, improving the quality of the sub-product and recovered oil (return oil) by about 0.12% with respect to total processed raw olives. The total solid content in the aqueous phase, following centrifugation, may be reduced by more than about 5%. In some implementations, the solid content of the aqueous phase after undergoing a centrifugation process may be reduced by about 6.2%. The aqueous centrifugation process may generally have greater efficiency in fat reduction than in the reduction of insoluble solids. It is to be appreciated, however, that other methods may be used as an alternative to, or in conjunction with, centrifugation, such as, but not limited to, ultrafiltration, microfiltration, nanofiltration, and absorption columns.

IIB. Separation of Aqueous Phase

Following aqueous phase centrifugation step 105, the centrifuged aqueous phase may undergo a heat treatment (described hereafter), separation via precipitation step 106A, and/or maceration and distillation step 106C. In accordance with some embodiments of the present invention, following centrifugation, the aqueous phase may be subjected to an accelerated precipitation process through various operations. For example, according to some implementations, the aqueous phase may undergo pH correction, wherein the pH may be adjusted to a particular value using a basic solution. According to preferred implementations, the pH of the aqueous phase may be adjusted to values between about 4.6 and about 7 using a 25% sodium hydroxide solution. Some implementations of precipitation step 106A may utilize different processes due to differences in the composition of the aqueous phase, thus pH correction parameters may be adjusted accordingly. For example, and without limitation, in some cases, a 1% to 5% solution of lime milk (limewater) may be used as an alternative to sodium hydroxide.

According to some embodiments, following pH correction, a solution of aluminum polychloride may be added to the aqueous phase. For example, and in accordance with some implementations, a solution of aluminum polychloride at a concentration of about 10% may be added to the aqueous phase. A function of aluminum polychloride is to coagulate and accelerate the sedimentation of suspended solids by modifying the Zeta potential of the liquids to be treated by neutralizing the repulsive forces. In preferred implementations, about 16.6 ml of a 10% solution of aluminum polychloride may be used per 1000 ml of aqueous phase.

During the precipitation process, there may be initially little, or no, separation of phases. After a period of time, however, a clear separation of phases may occur until a point in time where no further separation may occur. In some implementations, separation of phases may begin to occur after about 1 to 3 hours, with separation ceasing after about 20 to 30 hours. During the precipitation process, two clearly visible layers may form—a supernatant and precipitate. The supernatant may be generally a dark, or amber colored, liquid and the precipitate may comprise insoluble solids that have accumulated in the bottom of the container (e.g., flask, cylinder, tube, etc.). Since polyphenols are naturally soluble in water, the supernatant may contain a relatively higher concentration of polyphenols. The precipitate may also retain polyphenols, in addition to fat and dry matter. The precipitate may contain a relatively higher concentration of both dry and fat matter. In some implementations, following the treatment of the aqueous phase with aluminum polychloride, selective filtration techniques may be used to further isolate polyphenols.

It is to be appreciated that various separation techniques may be used as an alternative to, or in conjunction with, precipitation. For example, and without limitation, the aqueous phase and/or supernatant (which may, in some embodiments, be heat treated) may undergo a maceration and distillation step (e.g., maceration and distillation step 106C) which, in some implementations, may be carried out using ethanol (ethanol-vegetation water maceration) with subsequent distillation in order to isolate polyphenols. For example, and without limitation, the aqueous phase and/or supernatant may be macerated with a solution of ethanol for a period of time, producing a hydroalcoholic solution comprising polyphenols. Following, the solution may be distilled to obtain an extract of polyphenols. In preferred implementations, maceration may be performed with a solution of ethanol having a concentration of about 90%.

According to some implementations, the aqueous phase and/or supernatant may undergo an adsorption process with subsequent distillation. For example, and without limitation, the aqueous phase and/or supernatant may be exposed to resins which may be adapted for adsorbing polyphenols. In some implementations, the aqueous phase and/or supernatant may be exposed to resins for a period time in order to adsorb polyphenols. Following, polyphenols may be subsequently removed from the resins using a solution of ethanol. In preferred implementations, polyphenols may be removed from the resins using streams of a solution of ethanol. In some embodiments, a solution of ethanol having a concentration of about 70% may be used to remove polyphenols from the resins. Following, the resulting hydroalcoholic solution may be distilled to obtain an extract of polyphenols.

It is to be appreciated that any combination of treatments and/or separation processes may occur following aqueous phase centrifugation step 105. For example, and without limitation, a precipitation step (e.g., precipitation step 106A) and a maceration and distillation step (e.g., maceration and distillation step 106C) may each be performed after centrifugation of the aqueous phase, or, as another example, a precipitation step and an adsorption and distillation step may each be performed after centrifugation. Furthermore, any combination of treatments and/or separation processes may performed in any order. For example, and without limitation, a precipitation step (e.g., precipitation step 106A) may be performed before a heat treatment step (e.g., heat treatment step 106B).

IIC. Filtration

Following precipitation step 106A, heat treatment step 106B, or maceration and distillation step 106C, the supernatant may undergo filtration step 107. In some implementations, the supernatant may be subjected to a plate filtration process in order to further purify the aqueous phase. In some embodiments, one or more filter modules may be used to filter the centrifuged aqueous phase from the previous processes. In some implementations, a filter module may have a filter size of between 10-40 micrometers. In preferred implementations, a filter module may have a filter size of 10-30 micrometers. After filtration, and in accordance with some implementations, the dry matter content may be decreased by about 12%. The fat matter content, after filtration, may be decreased by about 18%.

IID. Heat Treatment

Polyphenols have the characteristics of being very bitter, due to the presence of various compounds such as oleuropein, dihydroxyphenyl glycol, oleocanthal, oleacein, oleuropein aglycone, and lignans. To reduce bitterness, the chemical structure of polyphenols may be broken, physically or chemically, to form macromolecules. Also, it may be advantageous to break the lignocellulosic structure of cell walls to allow the release of bioactive components, particularly biphenolic compounds such as hydroxytyrosol and tyrosol. To achieve this, a heat treatment may be carried out to complete the hydrolysis of oleuropein, ligstroside, and their aglycones, to produce hydroxytyrosol and tyrosol (illustrated in FIGS. 4A and 4B, respectively). During hydrolysis, oleuropein (illustrated in FIG. 2) loses glucose to form dicarboxymethyl oleuropein aglycone (also known as "oleacein", illustrated in FIG. 3), which is then converted to hydroxytyrosol and elenolic acid. Ligstroside loses glucose to form dicarboxymethyl ligstroside aglycone (also known as "oleocanthal", illustrated in FIG. 3).

Figure 5:
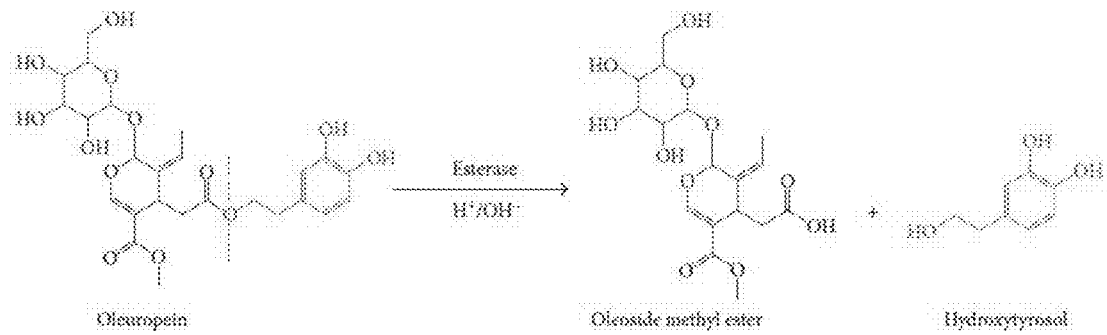
FIG. 5 is a diagram illustrating hydrolysis of oleuropein to form oleoside methyl ester and hydroxytyrosol.
Figure 6:
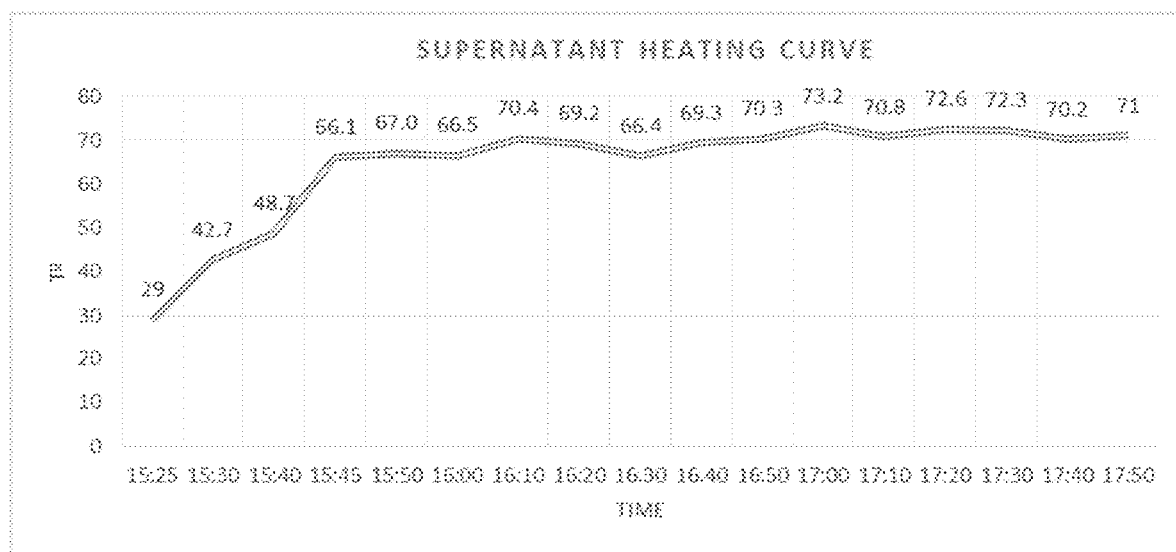
FIG. 6 is a line graph illustrating the temperature of a supernatant undergoing an exemplary heat treatment process over a period of time.

Following filtration step 107, heat treatment step 108 may be performed. In some implementations, a heat treatment may be carried out to cause hydrolysis of the oleuropein component of the polyphenols present in the supernatant. In preferred implementations, hydrolysis of the oleuropein component may be carried out according to the exemplary hydrolysis process illustrated in FIG. 5. In some implementations, a heat treatment may be carried out at between about 50° C. and about 110° C. In preferred implementations, a heat treatment may be carried out at between about 60° C. and about 95° C. In some implementations, a heat treatment may be carried out for about 1 to about 3 hours. For example, and as illustrated in FIG. 6, a heat treatment may be carried out at between about 30° C. and about 75° C. for about 2 hours. Heat treatment step 108 may allow for the breaking of polyphenol macromolecules, with the resulting products primarily comprising biphenolic compounds such as hydroxytyrosol and tyrosol, and, consequently, resulting in the reduction of bitterness.

In some implementations, acidic solutions, such as sulfuric or phosphoric acid solutions, of about 0.1% to about 5% concentration may be added during heat treatment. To reduce process times, in some implementations, heat treatment may be carried out at temperatures above about 100° C.

In some embodiments, the heat treatment step may occur after filtration (e.g., heat treatment step 108). In some embodiments, the heat treatment step may occur before filtration and after the centrifugation of the aqueous phase (e.g., heat treatment step 106B). It is to be appreciated that heat treatment step 106B may be carried out according to the processes as described herein relative to heat treatment step 108. It is to be further appreciated, that processes in accordance with some embodiments of the present invention comprise both heat treatment step 106B and 108.

III. Homogenization

Edible creams in accordance with embodiments of the present invention may comprise extra virgin olive oil, olive vegetation water, an emulsifier (e.g., citrus fiber), an acid (e.g., lactic acid, citric acid, or malic acid), lemon juice, and/or salt. In preferred embodiments, the extra virgin olive oil may comprise the resultant oil phase from paste centrifugation step 104 and the olive vegetation water may comprise centrifugated aqueous phase following filtration step 107. To make the oil-water emulsion physically stable, homogenization may be used for particle reduction. In some embodiments, the treated supernatant may undergo homogenization step 109. In some embodiments, homogenization step 109 may occur following heat treatment step 108. In some embodiments, homogenization step 109 may occur following filtration step 107. In some implementations, extra virgin olive oil may be used at an amount of at least about 35% of the total weight and citrus fiber may be dissolved in the olive oil. According to some implementations, the olive vegetation water may be treated in accordance with the processes and procedures described heretofore. In preferred implementations, the olive vegetation water may be used at an amount between about 24% and about 47% of the total weight. Exemplary amounts of ingredients used during various homogenization processes are illustrated in Table 1.

TABLE 1

| Ingredients | Amount (g) | Amount (g) | Amount (g) | Amount (g) | Amount (g) | Amount (g) |
|---|---|---|---|---|---|---|
| Extra Virgin Olive Oil | 2,500 | 2,500 | 2,500 | 2,200 | 3,500 | 3,500 |
| Aqueous Phase (without heat treatment) | 2,350 | 0 | 0 | 0 | 1,200 | 2,404 |
| Aqueous Phase (with heat treatment) | 0 | 2,350 | 2,350 | 2,500 | 0 | |
| Citrus Fiber | 150 | 150 | 0 | 150 | 150 | 258 |
| Other | 0 | 0 | 0 | 150 | 0 | 0 |

Figure 7:
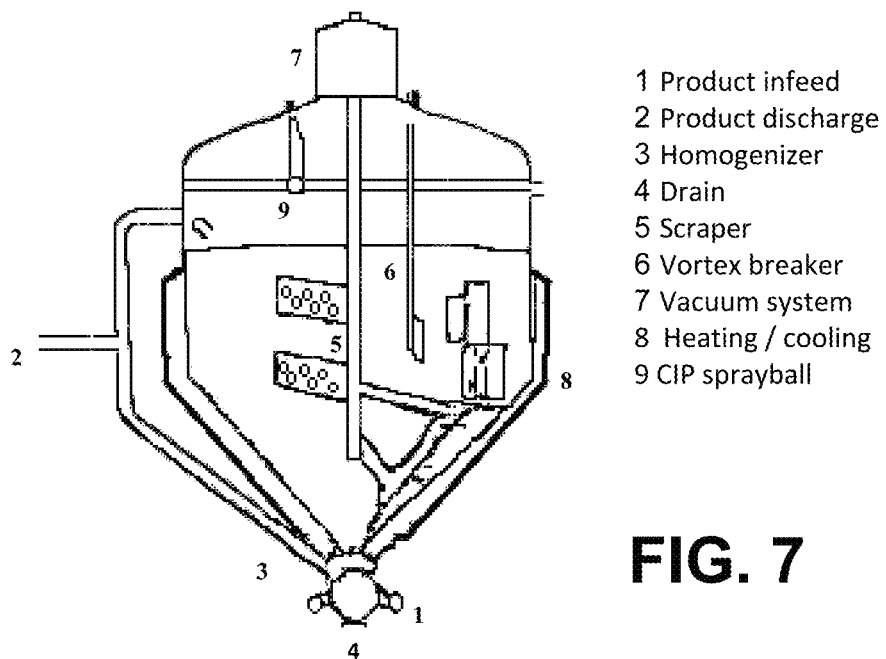
FIG. 7 is a diagram illustrating a conventional homogenizer.
Figure 8:
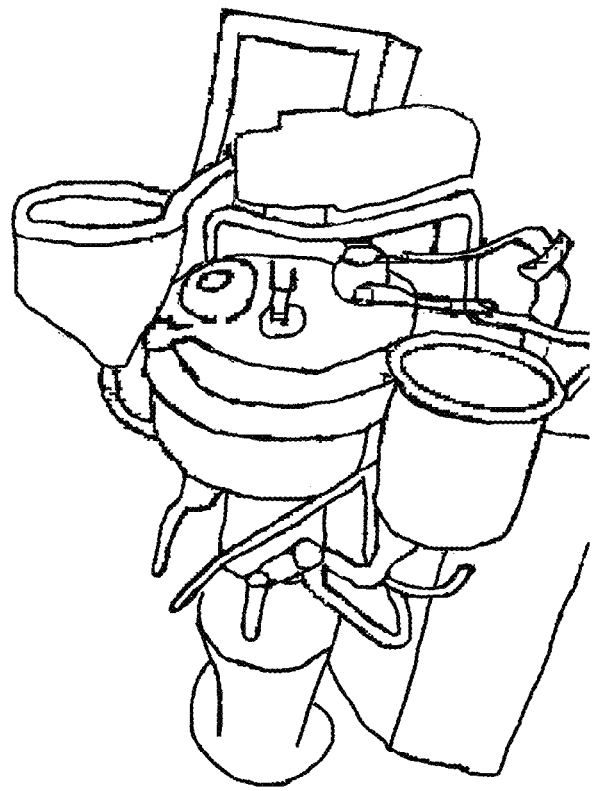
FIG. 8 is a photograph of a conventional homogenizer.

According to some embodiments of the present invention, a homogenization step may generally comprise four stages. First, a quantity of olive oil (in some implementations, 35% or more of the total weight) may be inserted into a homogenizer. Secondly, an emulsifier and any other additional ingredients may be added to the olive oil. For example, and in accordance with some implementations, citrus fiber, lemon juice, lactic acid (or the like), and salt may added to the olive oil in an amount which may be about 3% of the total weight. In some implementations, citrus fiber may be added as an emulsifier, providing texture and stability to the final olive oil based cream product. Following, the resulting mixture may be stirred until the emulsifier (e.g., citrus fiber), and any other solid ingredients, have dissolved. Once all solid ingredients have dissolved in the olive oil, the mixture may be gradually dosed over the treated supernatant while continuously stirring. Lastly, after the mixture has been homogenized, a soft and creamy stable emulsion may be obtained. Exemplary homogenizers are illustrated in FIGS. 7 and 8.

Alternatively, and according to some implementations, a homogenization step may comprise mixing olive oil with an emulsifier and, separately, mixing the supernatant with one or more additional ingredients. For example, in preferred implementations, olive oil may be mixed with citrus fiber until the citrus fiber has dissolved in the olive oil to form a first mixture. Separately, and in accordance with preferred implementations, the supernatant may be mixed with lemon juice, lactic acid, and salt to form a second mixture. Following, the first mixture may be slowly added to, and mixed with, the second mixture (using, for example, a homogenizer) until the first and second mixtures are completely homogenized.

IV. Preservation

Following homogenization step 109, the edible cream product may optionally undergo preservation step 110. According to some implementations, product preservation may be achieved by correcting the pH. In preferred implementations, the pH may be corrected to below 4.6. In some implementations, the edible cream product may be packaged with an inert gas in plastic trays or glass bottles (or the like).

In some implementations, the product may be packed at temperatures above about 80° C.

Edible Cream Product

In some embodiments, the present invention may provide an edible, olive oil based cream product which may be produced by the processes and methods described heretofore. The product may generally comprise olive oil, olive vegetation water (aqueous phase), one or more emulsifiers, and, optionally, one or more additional ingredients. In preferred embodiments, the edible cream product may comprise olive oil, olive vegetation water, citrus fiber, lemon juice, lactic acid, and salt. In some embodiments, the amount of olive oil present in the edible cream product may be about 35% or more of the total weight. In some embodiments, the amount of olive vegetation water present in the edible cream product may be less than about 56% of the total weight. In some embodiments, the amount of citrus fiber present in the edible cream product may be up to about 3%. In preferred embodiments, the amount of citrus fiber present in the edible cream product may be between about 1.3% and about 3%, of the total weight. In some embodiments, the amount of lemon juice present in the edible cream product may be between about 4% and about 5% of the total weight. In some embodiments, the amount of lactic acid present in the edible cream product may be between about 0.4% and about 1% of the total weight. In some embodiments, the amount of salt present in the edible cream product may be between about 1.3% and about 3% of the total weight. In some embodiments, additional flavorant ingredients may be added to the edible cream. For example, and without limitation, flavorants such as orange juice, peppers, jalapeños, garlic, etc. may be present in the edible cream product. In preferred embodiments, additional ingredients may be added to the edible cream in an amount of up to about 3% by weight. In some embodiments, the polyphenol content of the edible cream product may be between about 750 and about 1800 ppm. However, it is to be appreciated that, in some cases, the polyphenol content may be higher or lower due to variability in the chemical composition of raw olives used in the production of the edible cream product. Exemplary amounts of ingredients present in various edible creams are illustrated in Table 2.

TABLE 2

| Components | Weight (g) | | Proportion of Total Product (% by weight) | |
|---|---|---|---|---|
| | Minimum | Maximum | Minimum | Maximum |
| Extra Virgin Olive Oil | 140 | 279 | 35.1 | 69.7 |
| Supernatant | 92 | 224 | 23.0 | 56.0 |
| Lemon Juice | 18 | 18 | 4.5 | 4.5 |
| Citrus Fiber | 5 | 11.8 | 1.3 | 3.0 |
| Salt | 4 | 4 | 1.0 | 1.0 |
| Lactic Acid | 2 | 4 | 0.5 | 1.0 |
| TOTAL | 400 | | 100 | |

It is to be understood that variations, modifications, and permutations of embodiments of the present invention may be made without departing from the scope thereof. It is also to be understood that the present invention is not limited by the specific embodiments, descriptions, or illustrations or combinations of either components or steps disclosed herein. Thus, although reference has been made to the accompanying figures, it is to be appreciated that these figures are exemplary and are not meant to limit the scope of the invention.

Moreover in this document, relational terms, such as second, top and bottom, and the like may be used solely to distinguish one entity or action from another entity or action without necessarily requiring or implying any actual such relationship or order between such entities or actions. The terms "comprises", "comprising", "has", "having," "includes", "including", "contains", "containing", or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional elements of the same type in the process, method, article, or apparatus that comprises, has, includes, contains the element. The terms "a" and "an" are defined as one or more unless explicitly stated otherwise herein. The terms "substantially", "essentially", "approximately", "about", or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

What is claimed is:

1. A process for producing an edible cream from olives, comprising the steps of:
   a) milling said olives to form a paste;
   b) malaxating said paste;
   c) centrifuging said paste into a resultant oil phase, a resultant aqueous phase, and a resultant pomace;
   d) centrifuging said aqueous phase;
   e) separating said aqueous phase into a resultant precipitate and a resultant supernatant;
   f) filtering said supernatant; and
   g) homogenizing said supernatant, said oil phase, and an emulsifier to form said cream.

2. The process of claim 1, wherein said olives have a maturity index of between 1 and 5.

3. The process of claim 1, wherein a variety of said olives is one of the group consisting of Koroneiki, Manzanilla, Changlot Real, Hojiblanca, Empeltre, Coratina, and Arbequina.

4. The process of claim 1, wherein said step of milling said olives comprises crushing said olives through a sieve having a size of about 4 to about 7 mm.

5. The process of claim 1, wherein said step of malaxating said paste occurs for a duration of between about 35 minutes and about 95 minutes.

6. The process of claim 1, wherein said step of malaxating said paste occurs at a temperature of between about 22° C. and about 37° C.

7. The process of claim 1, wherein said step of centrifuging said paste comprises horizontally centrifuging said paste at between about 3,200 and about 3,700 revolutions-per-minute.

8. The process of claim 7, wherein said step of centrifuging said paste comprises adding water to said paste.

9. The process of claim 1, wherein said step of centrifuging said aqueous phase comprises vertically centrifuging said aqueous phase at between about 6,800 and about 7,200 revolutions-per-minute.

10. The process of claim 1, wherein said step of separating said aqueous phase comprises precipitating said aqueous phase.

11. The process of claim 10, further comprising adjusting a pH of said aqueous phase.

12. The process of claim 11, wherein said pH of said aqueous phase is adjusted to between about 4.6 and about 7.

13. The process of claim 11, wherein said pH of said aqueous phase is adjusted by the addition thereto of one of the group consisting of sodium hydroxide, lime milk, and combinations thereof.

14. The process of claim 10, further comprising adjusting a Zeta potential of said aqueous phase.

15. The process of claim 14, wherein said Zeta potential of said aqueous phase is adjusted by the addition thereto of aluminum polychloride.

16. The process of claim 1, wherein said step of separating said aqueous phase comprises macerating and distilling said aqueous phase.

17. The process of claim 1, wherein said step of separating said aqueous phase comprises adsorption with resins and distilling said aqueous phase.

18. The process of claim 1, wherein said step of separating said aqueous phase comprises heating said aqueous phase.

19. The process of claim 1, wherein said step of filtering said supernatant comprises filtering said supernatant through a plate filter having a filter size of between about 10 to about 40 micrometers.

20. The process of claim 1, further comprising, after said step of filtering said supernatant and before said step of combining said supernatant to produce said mixture, a step of heating said supernatant.

21. The process of claim 20, wherein said step of heating said supernatant comprises heating said supernatant to a temperature of between about 60° C. and about 95° C.

22. The process of claim 21, wherein said step of heating said supernatant occurs for a duration of between about 1 and about 3 hours.

23. The process of claim 20, wherein said step of heating said supernatant comprises heating said supernatant to a temperature of greater than about 100° C.

24. The process of claim 23, wherein said step of heating said supernatant comprises adding an acidic solution to said supernatant.

25. The process of claim 24, wherein said acidic solution comprises an acid, wherein said acid is one of the group consisting of sulfuric acid and phosphoric acid.

26. The process of claim 1, wherein said emulsifier comprises citrus fiber.

27. The process of claim 1, wherein said step of homogenizing further comprises combining an acid with said supernatant, said oil phase, and said emulsifier.

28. The process of claim 27, wherein said acid comprises one of the group consisting of lactic acid, citric acid, malic acid, lemon juice, and combinations thereof.

29. The process of claim 1, wherein said step of homogenizing further comprises combining a salt with said supernatant, said oil phase, and said emulsifier.

30. The process of claim 1, wherein said step of homogenizing further comprises combining a flavorant with said supernatant, said oil phase, and said emulsifier.

31. The process of claim 30, wherein said flavorant comprises one of the group consisting of a salt, citrus juice, peppers, garlic, and combinations thereof.

32. The process of claim 1, wherein said step of homogenizing comprises combining a first preparation with a second preparation to form said cream, wherein said first preparation comprises said oil phase and said emulsifier, and wherein said second preparation comprises said supernatant.

33. The process of claim 32, wherein said first preparation further comprises one of the group consisting of an acid, a salt, a flavorant, and combinations thereof.

34. The process of claim 32, wherein said second preparation further comprises one of the group consisting of an acid, a salt, a flavorant, and combinations thereof.

35. The process of claim 1, wherein said cream comprises, by weight, greater than about 35% of said oil phase and less than about 56% of said supernatant.

36. The process of claim 35, wherein said emulsifier comprises citrus fiber, wherein said cream further comprises lemon juice, lactic acid, and salt, and wherein said cream comprises, by weight, between about 1.3% and about 3% citrus fiber, between about 4% and about 5% lemon juice, between about 0.4% and about 1% lactic acid, and between about 1.3% and about 3% salt.

37. The process of claim 36, wherein said cream further comprises less than about 3% by weight of a flavorant.

38. The process of claim 1, further comprising the step of preserving said cream.

39. The process of claim 38, wherein said step of preserving said cream comprises correcting the pH of said cream to less than about 4.6.

40. The process of claim 38, wherein said step of preserving said cream comprises packaging said cream at a temperature greater than about 80° C.

41. A process for manufacturing an edible cream comprising the sequential steps of:
   a) horizontally centrifuging olive paste into a resultant oil phase and a resultant aqueous phase;
   b) vertically centrifuging said aqueous phase;
   c) maintaining a pH of said aqueous phase between about 4.6 and about 7;
   d) adjusting a Zeta potential of said aqueous phase by the addition thereto of aluminum polychloride;
   e) precipitating said aqueous phase into a resultant supernatant;
   f) filtering said supernatant through a plate filter having a filter size of between about 10 to about 40 micrometers;
   g) heating said supernatant; and
   h) homogenizing said oil phase, said supernatant, and an emulsifier by first combining said oil phase and said emulsifier, and then combining said supernatant with said combined oil phase and said emulsifier.

42. The process of claim 41, wherein said heating step comprises heating said supernatant to a temperature of between about 60° C. and about 95° C. for a duration of between about 1 and about 3 hours.

43. The process of claim 41, wherein said heating step comprises adding an acidic solution comprising an acid to said supernatant and heating said supernatant to a temperature of greater than about 100° C., wherein said acid is one of the group consisting of sulfuric acid and phosphoric acid.

44. The process of claim 15, wherein said aluminum polychloride is added to said aqueous phase as a solution at a concentration of about 10%.

45. The process of claim 44, wherein an amount of said solution of said aluminum polychloride is about 16.6 ml per 1000 ml of said aqueous phase.

46. The process of claim 16, wherein said aqueous phase is macerated with a solution of ethanol.

47. The process of claim 25, wherein a concentration of said acid in said acidic solution is between about 0.1% to about 5%.

* * * * *